US009589304B2

(12) United States Patent
Ryu et al.

(10) Patent No.: US 9,589,304 B2
(45) Date of Patent: *Mar. 7, 2017

(54) METHOD AND SYSTEM OF PROVIDING SOCIAL NETWORK SERVICES ASSOCIATED WITH MANAGEMENT OF PERSONAL CONNECTIONS AND OFF-LINE ACTIVITY BY APPLYING LIFE CYCLE CONCEPT OF CREATURE

(71) Applicant: Chang Su Ryu, Seoul (KR)

(72) Inventors: Chang Su Ryu, Seoul (KR); Kwang Seok Lee, Seoul (KR); Jae Chan Lee, Seoul (KR)

(73) Assignee: Chang Su Ryu (KR)

( * ) Notice: Subject to any disclaimer, the term of this patent is extended or adjusted under 35 U.S.C. 154(b) by 267 days.

This patent is subject to a terminal disclaimer.

(21) Appl. No.: 14/286,959

(22) Filed: May 23, 2014

(65) Prior Publication Data

US 2014/0351333 A1 Nov. 27, 2014

(30) Foreign Application Priority Data

May 24, 2013 (KR) ........................ 10-2013-0058779

(51) Int. Cl.
*G06F 15/16* (2006.01)
*G06Q 50/00* (2012.01)

(52) U.S. Cl.
CPC .................................... *G06Q 50/01* (2013.01)

(58) Field of Classification Search
CPC ..... H04L 51/32; H04L 51/12; G06F 3/04817; H04N 21/25866; G06Q 50/01
USPC .......................................................... 709/204
See application file for complete search history.

(56) References Cited

U.S. PATENT DOCUMENTS

2009/0319914 A1 12/2009 Roseway et al.
2009/0327928 A1 12/2009 Dedis et al.
2012/0030193 A1* 2/2012 Richberg ............... G06Q 10/10 707/719
2013/0080467 A1* 3/2013 Carson .............. G06F 17/30867 707/769
2014/0075317 A1* 3/2014 Dugan ................ G06F 3/04842 715/719
(Continued)

FOREIGN PATENT DOCUMENTS

CN 101877011 A 11/2010
CN 101968810 A 2/2011
(Continued)

OTHER PUBLICATIONS

Nakahara, iTREE: Developing and evaluating the Mobile Phone Software for visualizing the state of Learner's Interaction on bulletin board system, Japan Society for Educational Technology, issued on Mar. 20, 2004, vol. 27, No. 4, pp. 437-445.
(Continued)

*Primary Examiner* — Frantz Jean

(57) ABSTRACT

Provided are method and system of providing a social network service (SNS) in which life cycle concepts of creatures are a motif. Particularly, user's personal connection information and relationships between users are separately expressed as a structure of a creature made in a graphic, and a non-disclosure information portion for private use and a disclosure information portion for public use are clearly divided.

14 Claims, 8 Drawing Sheets

(56) References Cited

U.S. PATENT DOCUMENTS

2014/0129942 A1* 5/2014 Rathod ............ H04N 21/44222
715/720

FOREIGN PATENT DOCUMENTS

| | | | |
|---|---|---|---|
| CN | 102254044 | A | 11/2011 |
| CN | 102946331 | A | 2/2013 |
| JP | 2002245212 | A | 8/2002 |
| JP | 2009146253 | A | 7/2009 |
| JP | 201274876 | A | 4/2012 |
| KR | 20120002396 | A | 1/2012 |
| KR | 20120087210 | A | 8/2012 |

OTHER PUBLICATIONS

Zhan, Zhihu, "The design and the implement of a system based on SNS Family tree", Huazhong University of Science and Technology Master Dissertation, May 2009, 17 pages.

Zhang, Yanchao, "Studies on the information dissemination mode of Social Networking Service and the evolution process of consensus", Beijing Jiaotong University Doctoral Dissertation, Jun. 2012, 12 pages.

* cited by examiner

METHOD AND SYSTEM OF PROVIDING SOCIAL NETWORK SERVICES ASSOCIATED WITH MANAGEMENT OF PERSONAL CONNECTIONS AND OFF-LINE ACTIVITY BY APPLYING LIFE CYCLE CONCEPT OF CREATURE

CROSS-REFERENCE TO RELATED APPLICATION

This application claims priority to Korean Patent Application No. 10-2013-0058779 filed on May 24, 2013 and all the benefits accruing therefrom under 35 U.S.C. §119, the contents of which are incorporated by reference in their entirety.

BACKGROUND

The present disclosure relates to method and system of providing social network service (hereinafter referred to as "SNS") in which life cycle concepts of creatures are applied to allow users to express their information on the SNS, information of other users associated with the users are systematically managed, and SNS activities are connectable even to off-line activities.

Particularly, the present disclosure expresses information of users to correspond to structures of trunks and roots of a tree, and separately manages personal connection information (school relations, clubs, etc.) for public use, which users want to disclose, and personal connection information (families, closed small groups, etc.) for private use, which users do not want to disclose, into a trunk and roots of a tree such that related data may be hierarchically and three-dimensionally managed.

Also, in the case a user expresses his/her intention of wanting off-line activities, such as donation on SNS, user's intension is connected to an off-line cooperate company, and at the same time activities of the connected cooperate company are expressed as a creature (tree) separate from a creature (tree) expressing information of the user and are displayed on a screen of the SNS as the creatures (trees) of the user and cooperate company.

Resultantly, the present disclosure relates to method and system of providing an SNS in which SNS activities of users are connected to off-line social activities, such as donation and the like, and are displayed and confirmed on an SNS website.

As modern people contact many other people in an economically and socially diverse society during their lives, width of relationship between people increases. However, in spite that people continues meetings with other people, an increase in depth of relationship that is actually important is hard to obtain.

This is because it is difficult to make time for exchange of relationship, necessity of management for exchange of relationship is not urgent and thus continues to be put off, and the timing for management of personal connections is ultimately missed, so that the amount of information is accumulated to such a degree that individuals are difficult to manage.

To this end, people want to establish their social relationship database that is easier for management of personal connections and may solve a security issue that is a limitation of the existing SNS.

Meanwhile, a website that professionally provides only a service for management of personal connections to users who are registered as members has been recently opened and is in use by many people. To use such a personal connections management service, each user inputs information (address, E-mail, phone number, and the like) of a third party whom each user wants to register according to a form which is basically provided by the corresponding website to register the information of the third party in the provided personal connections management service, and then may access to the corresponding website and use the stored personal connections management service.

A member who has registered in a website providing a personal connections management service searches personal information of other members registered in the corresponding website, and then may register the searched personal information of other members in his/her personal connections information for use.

However, the personal information of each of the members registered in a personal connections management service of a specific member is limited to personal information (e.g., name, E-mail address, phone number, a portion of address, and the like) which is determined in advance for the purpose of disclosure by a corresponding member.

Also, the existing method of managing individual's personal connections using a web server on Internet has a difficulty in establishing database, using the established database, and correcting the established database.

Further, the existing method of managing personal connections stays in a function of rapidly searching and storing basic information of personal connections two-dimensionally inputted by users based on the basic information.

Furthermore, the existing method of managing personal connections has an inconvenience in which disclosure or non-disclosure of personal information should be set in a lump or individually through individual connection to related persons.

Moreover, the existing SNS has deficiency in connecting SNS activities to off-line activities and expressing off-line activities on the SNS.

The existing SNS cannot help setting information sharing range and the like individually due to a structural limitation. Also, since the existing SNS uses a method of determining whether or not to block information according to user's selection after first sharing information, it has a danger that may cause invasion of privacy, such as unwanted disclosure of information.

Also, since the existing SNS is based on texts, it may not display relationships between people, classifications, or the like that are the greatest core features of the SNS in a way that users can view easily and conveniently.

Further, since the existing SNS is limited to online activities, it does not play a role as a medium to induce a connection of the online activities to off-line activities, for example, social activities and the like, such as diffusion of donation culture.

SUMMARY

Therefore, the present disclosure provides a service function to complement the existing SNS and prevent invasion of privacy in advance, three-dimensionally express relationship between people, a small group meeting, and the like, and induce a connection of online activities to off-line activities.

In accordance with an exemplary embodiment, a method of providing a social network service is characterized in that activity of a user account is set to a plurality of stages, each of the plurality of stages being set to correspond to a life style of a creature.

The life style of the creature may include a series of processes of creation, growth, decay and extinction of the creature.

The creature may be a tree.

The expressing of change process of the activity of the user account to correspond to the life style of the creature may include expressing the respective stages of the life style of the creature in different graphic information, and matching the different graphic information with the respective stages of the change process of the activity of the user account.

In accordance with another exemplary embodiment, a method of providing a social network service is characterized in that activity of a user account is expressed in a graphic corresponding to life style of a tree, a small group related to a user corresponds to a branch of the tree, and individuals including individuals in the small group related to the user are expressed in a graphic to correspond to leaves dangling on the branch of the tree.

The degree of exchange between the user and the small group may be expressed in a graphic to correspond to a change in thickness or color of the branch of the tree.

The degree of exchange between the individuals may be expressed in a graphic to correspond to a change in color of the leaves and fallen leaves.

When the user performs an off-line connection activity, an event tree corresponding to the off-line connection activity may be created and depicted in a graphic.

The event tree may have a cycle of creation, growth, decay and extinction which correspond to the number or activities of participants participating in the off-line connection activity and are depicted in graphics.

The graphics for the tree, the leaves, and the branches may be depicted by applying a dynamic focusing technique such that information of other users related to the leaves and branches corresponding to the number of clicks or touches of the user is sequentially enlarged and displayed regardless of resolution and platform of a terminal used by the user.

The information set to be disclosed by the user is displayed corresponding to structures of trunks and branches of the tree, and the information set not to be disclosed by the user is displayed corresponding to a root structure of the tree.

In accordance with still another exemplary embodiment, a system of providing a social network service which expresses activity of a user account to correspond to a life cycle of a creature includes a user terminal, a user access managing unit, a user database server, an SNS managing server, and a web browser-associated server, wherein the user terminal depicts each stage of the activity of the user account in a graphic to correspond to each stage of a life style of the creature.

The user terminal may have an input/output interface enabling the user to input or correct user information and provide a function setting a new event tree by inputting an off-line activity.

The system of providing the social network service may further include a commercial server which separately manages company account information, the company account information being associated with off-line activity information in which the user wants to participate, and performs a function of providing contents associated with the off-line activity of the user.

The user database server may store user information or change of activity inputted by the user, and may then provide the stored information or the change of activity to the user when the user searches the user information and the change of activity.

The SNS managing server may display the corresponding information on a user account tree or an event tree based on the user input information and the information inputted by a commercial company, incorporate the information associated with a web browser to display the incorporated information as trees of the user account, other users or the commercial company such that the user, the other users and the company may identify the trees displayed on the respective accounts at the same time.

The web browser-associated server may be associated with a web browser by clicking or touching a function set as the user account on the user terminal and may search the information corresponding to keyword input of the user.

The commercial server may store data of companies providing off-line activities for users when the users want activities associated with off-line, input data thereof to a corresponding server, and then provide information updating the corresponding data depending on activities thereof.

The backup server may store user information, web browser-associated information, information updated in the commercial server, and the like, and minimize system error or data loss by automatically storing the user information, the web browser-associated information, and information changed in the commercial server when the user information, the web browser-associated information and the information stored in the commercial server are changed.

BRIEF DESCRIPTION OF THE DRAWINGS

Exemplary embodiments can be understood in more detail from the following description taken in conjunction with the accompanying drawings, in which.

DETAILED DESCRIPTION OF EMBODIMENTS

Figure 1:
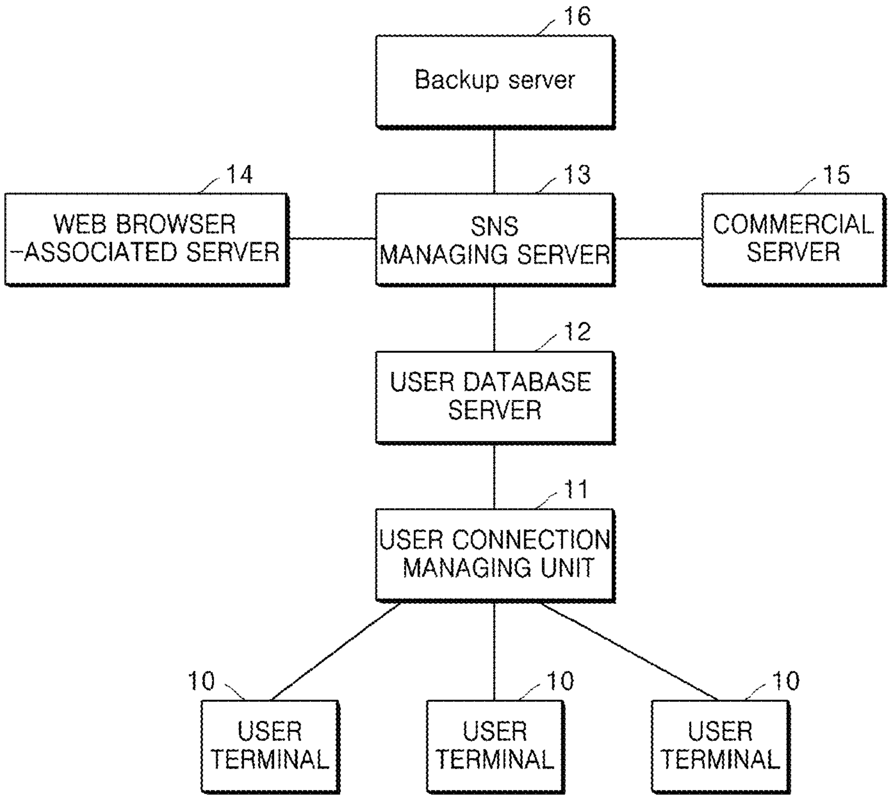
FIG. 1 is a block diagram schematically showing a service system using an SNS in accordance with an embodiment of the present disclosure.

The attached drawings for illustrating preferred embodiments of the present disclosure are referred to in order to gain a sufficient understanding of the present disclosure, the merits thereof, and the objectives accomplished by the implementation of the present disclosure.

Hereinafter, the present disclosure will be described in detail by explaining preferred embodiments of the invention with reference to the attached drawings. The invention may, however, be embodied in many different forms and should not be construed as being limited to the embodiments set forth herein. For clarity of description, elements which are not related to the description are omitted, and like reference numerals denote like elements.

The present disclosure provides method and system of providing an integrated social network service (SNS) having a new data structure and a new user interface in a method of transferring, exchanging and sharing information between users of a social network. Hereinafter, description will be made.

1. Integrated Social Network Service System Having User Interface Such as Life Cycle of Tree in SNS Account Referring to FIG. 1, the present disclosure provides a social network system having the following user accounts in an SNS.

As shown in FIG. 1, a social network system according to an embodiment of the present disclosure includes user terminals 10, a user connection managing unit 11, a user database server 12, an SNS managing server 13, a web browser-associated server 14, a commercial server 15, and a backup server 16.

The user terminal 10 enables a user to input/output information in using an SNS of the present disclosure by first allowing the user to input information thereof to create a user account tree, and then to correct the input information to set a new event tree, and providing a function to retrieve associated companies in off-line.

The User may confirm information of a wanted portion by directly clicking/touching screens to enlarge and reduce wanted information. Also, the user terminal allows a user to retrieve wanted information through a web browser associated with the user terminal, to purchase an item, or to participate in social activities, such as off-line event activities (e.g., donation, meeting, get-together, club activity, etc.).

The user connection managing unit 11 and the user database server 12 relate to systems that collect, store and manage input information when users are connected to a server to input, correct, and complement information.

After a user input information thereof at first and select a tree thereof to set an account tree, when the user logs in, the user connection managing unit 11 confirms whether the user is an authorized user. Thereafter, the user connection managing unit 11 collects information and the like changed by the user and stores, and manages the changed information.

At this time, the user connection managing unit 11 separates the stored information into public information for disclosure and personal information for non-disclosure, and blocks a connection of other users to the personal information for non-disclosure.

Also, while the user manages the user account tree, in the case a small group activity of the user is insufficient or management of the user to other users is insufficient, the user connection managing unit 11 provides a function of notifying such a fact to the user in the form of "a notification alarm", "e-mail alarm", or the like.

Further, when the user intends to confirm activities of other users or companies, the user may confirm the activities based on the information collected in the user database server 12. At this time, the user database server 12 stores changes of activities inputted in the present service by other users or companies, and then provides the stored changes of activities to the user when the user retrieves the changes of activities.

At this time, the user connection managing unit 11 provides only an expression function such that the user may confirm activities, such as connections, bulletin board messages, and comments of other users or companies as well as a participating tree.

That is, there is provided a control system having a functional limitation in which a change of an event tree created by other user is managed only by a user creating the corresponding event tree, and other users participating in an event expressed by the event tree are allowed to perform a connection, make bulletins, or write comments.

The SNS managing server 13 is a server managed by a service provider, and relates to a system which integratedly manages users, off-line service providers and the web browser-associated server.

For example, when it is assumed that users purchase items or perform activities associated with off-line activities, when the users select and purchase items, such as music and the like, the service provider is connected to companies providing music contents through the SNS managing server 13 such that the users may purchase the corresponding items.

At this time, the companies provide the music contents through a typical electronic commerce method.

When users perform off-line activities, such as donation and the like by the above-described method, the users may confirms off-line activities of other users and then determine whether or not to participate in the off-line activities.

Also, when a user wants to participate in related companies which have been retrieved by using a search method associated with the dynamic focusing technique, the user contacts other users (e.g., makes bulletins, writes comments, etc. expressing the intent of wanting to participate in a donation tree of other user) or retrieves companies.

Figure 15:
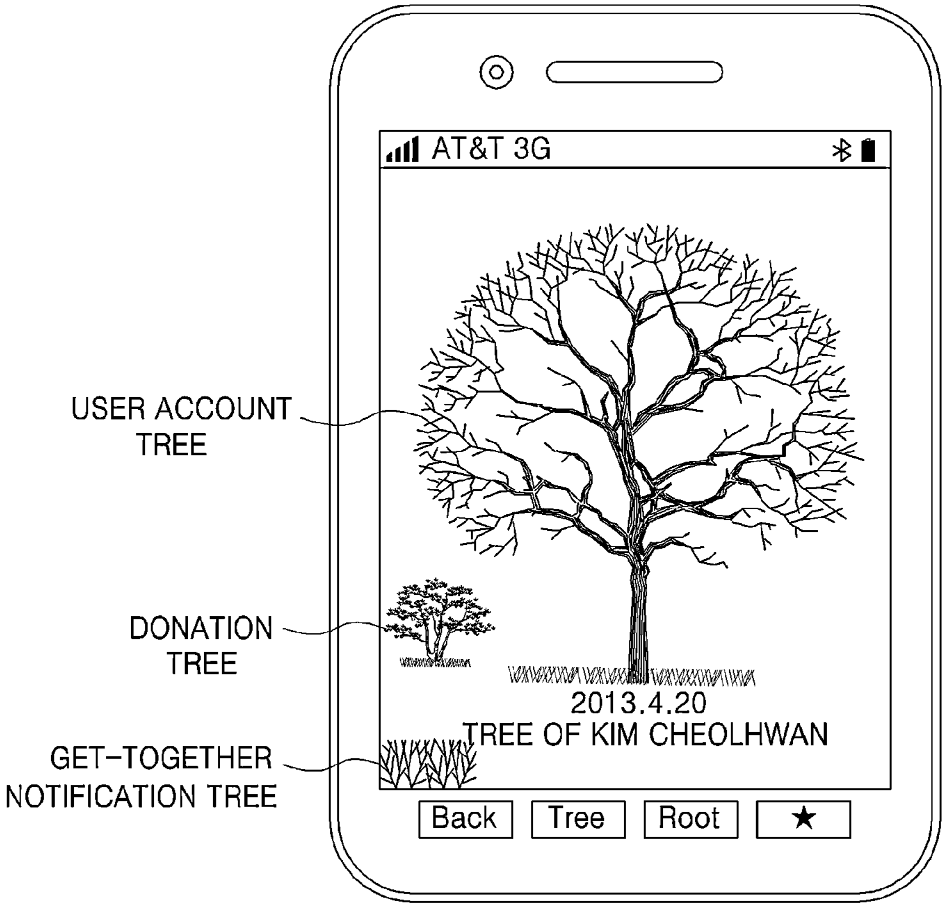
FIG. 15 is an illustration view of a grown user account tree in accordance with an embodiment of the present disclosure.

Thereafter, in the case the user determines donation and participates in the donation tree of other user, the SNS managing server 13 provides a function in which the participation is expressed in the form of a leaf on the donation tree of other user and at the same time the donation tree of other user is expressed beside the user account tree as shown in FIG. 15.

Meanwhile, in the case a user wants to make a donation to a related company performing donation activities, when the user expresses intention to make a donation, the user's intention is transferred to the related company through the SNS managing server 13, and then the related company expresses the donation activities on the user account tree thereof in the form of bulletins.

At this time, information is collected and stored in the database server 12 according to the activities of the related company, and is integrated by the SNS managing server 13 to express the activities of the related company on the user account tree of the related company.

The SNS managing server 13 expresses the donators who make a donation to the donation tree of the related company in the form of leaves, and also expresses the donation tree beside the user account trees of the donators.

That is, in the case a user participates in an off-line activity, such as donation, a donation tree created by donation of the user may be equally confirmed beside the user account tree and the SNS managing server 13 provides such a function.

The web browser-associated server 14 provides association with existing search sites.

Figure 13:
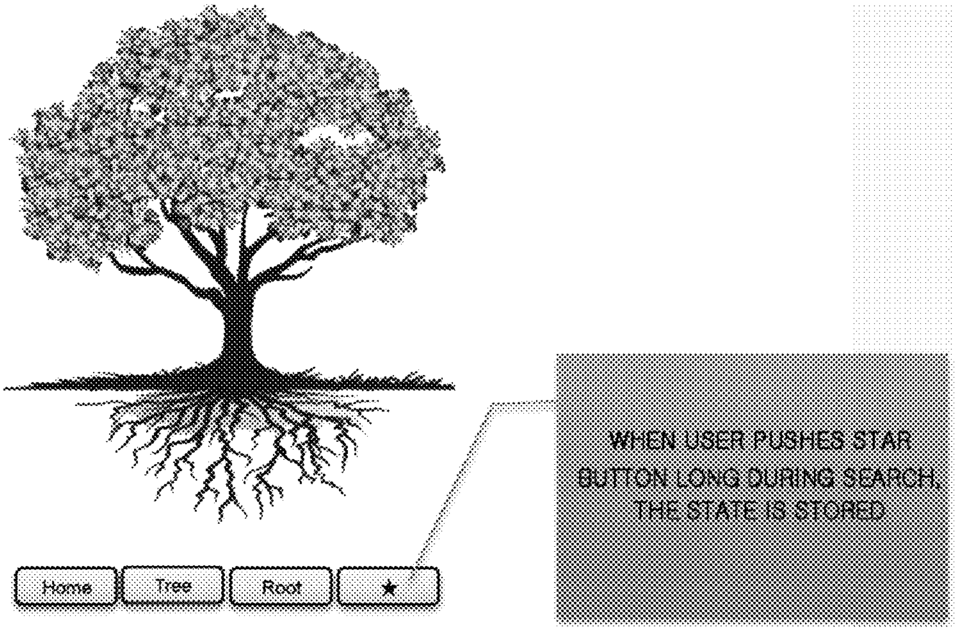
FIG. 13 is an illustration view for shortcut keys expressed on a platform and explanation for the shortcut keys in accordance with an embodiment of the present disclosure.
Figure 14:
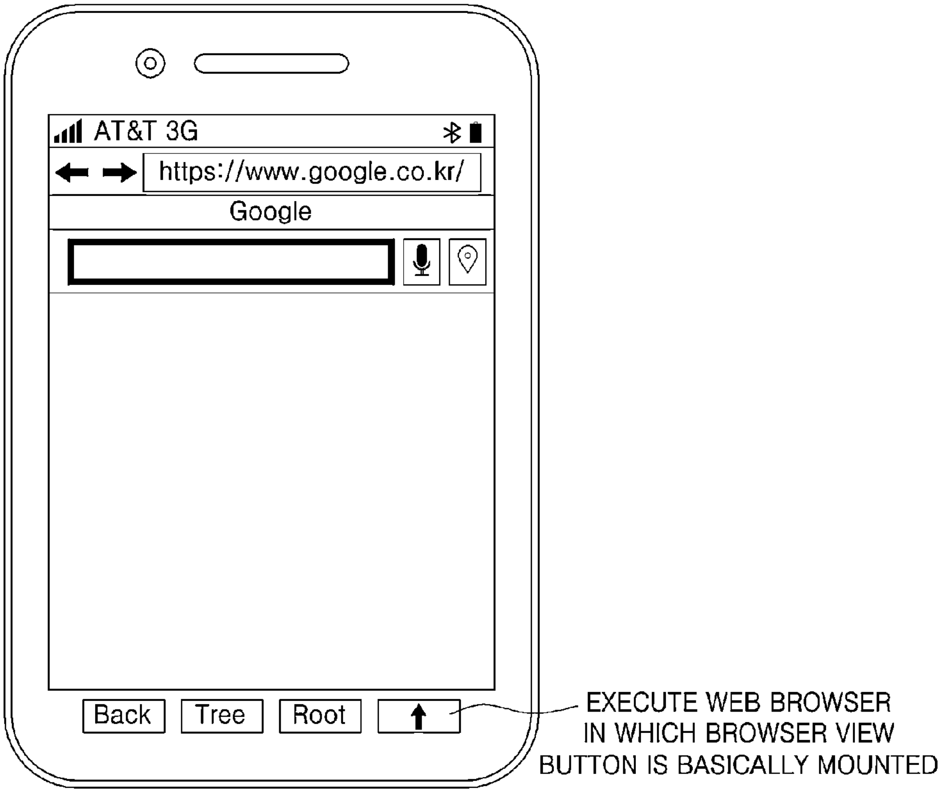
FIG. 14 is an illustration view of a search method associated with a dynamic focusing technique in accordance with an embodiment of the present disclosure.

When a user clicks/touches a star key in FIG. 13 and accesses to a web browser, the user terminal is connected to an existing search site (e.g., 'Google', 'Naver', 'Daum', or the like) such that the user may easily retrieve a related company associated with an off-line activity which the user wants.

In the case the retrieved company is a company subscribed in the present service, the user terminal is connected to the user account tree of the corresponding company through a search site such that the user may confirm the user account tree of the corresponding company, and thus the user may confirm the activities of the corresponding company and determine whether or not to participate in the social activities of the corresponding company.

The commercial server 15 means a server of a service provider which provides a fee/free of charged item in the service of the present disclosure and performs an off-line-associated activity (e.g., donation, etc.).

The commercial server 15 is connected to the SNS managing server 13, and thus a user obtains company information provided by the commercial server 15 connected to the SNS managing server 13 and selects a company matched with intention thereof to be connected to an off-line social activity.

The backup server 16 means a server to minimize occurrence of data initialization due to errors that may occur in the user server.

When a change in user information occurs in association with data input, the changed information is stored in the backup server 16 periodically (e.g., one time every three days) or by setting of a service provider. By doing so, error and data loss of the service system in accordance with the present disclosure may be minimized.

Figure 3:
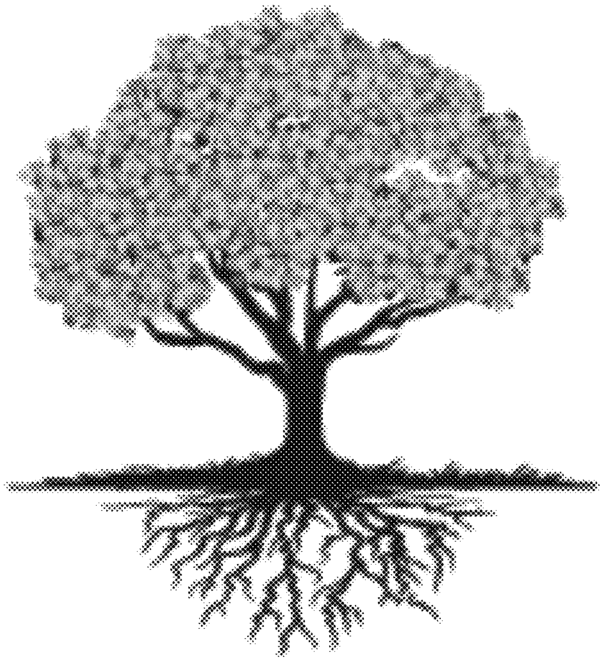
Figure 4:
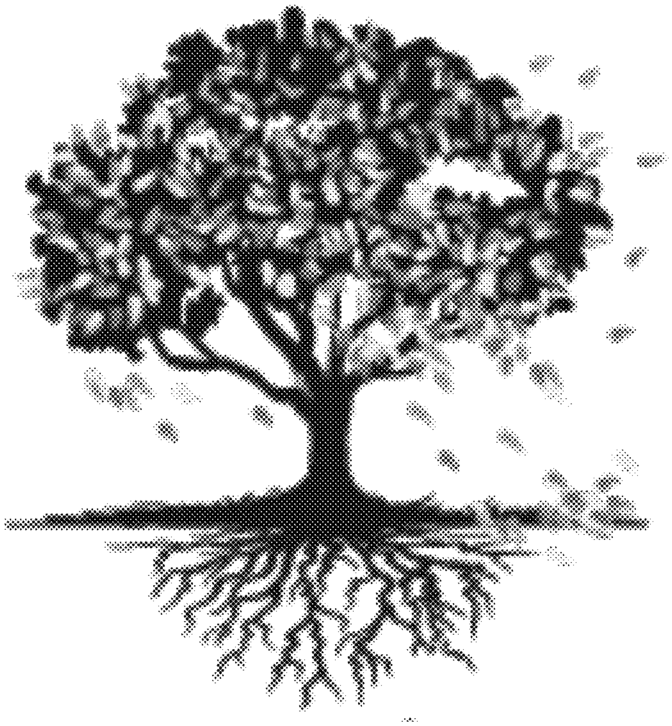

2. Method of Expressing Life Cycle of Tree in SNS Account of the Present Disclosure A) Creation of User Account Tree FIGS. 2, 3 and 4 are views showing a life cycle of a user account tree in a social network service in accordance with an embodiment of the present disclosure.

Figure 2:
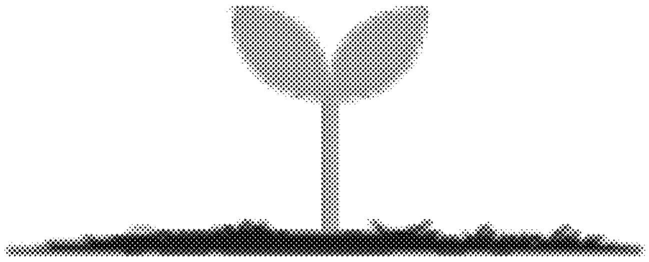
FIGS. 2, 3 and 4 are concept views of an SNS in accordance with an exemplary embodiment of the present disclosure in which a life cycle concept of a tree is introduced.

FIG. 2 is a display screen when a user subscribes to a social network service of the present disclosure in accordance with a typical user member joining method, i.e., when a user subscribes as a new member.

When a user subscribes as a new member, the SNS of the present disclosure initially expresses a user account tree in the form of a sprout of a plant as shown in FIG. 2. Thereafter, small groups connected to the user account are expressed as a trunk and branches and roots of a tree. At this time, information and groups (e.g., school relations, clubs, etc.) which a user discloses to other users are expressed as a trunk and branches of a tree, and information (e.g., family information, non-disclosure small group gathering) which the user does not disclose is expressed as roots of the tree.

B) Growth of User Account Tree

Since the small groups to which a user subscribes or which the user sets are expressed as a trunk and branches of a tree, as the number of the small groups to which a user subscribes and which the user sets increases, the number of the branches of the user account tree increases, and when the number of the small groups is a predetermined number or more (e.g., 3 or more), the user account is expressed in the form of a tree shown in FIG. 3 and grown from the form of the sprout shown in FIG. 2.

For example, when a new small group (e.g., an entertainer society acquainted with a user) is set, the small group and other users related to the small group are expressed as a branch and leaves dangling on a tree.

When the activity in the corresponding small group is active (e.g., many contacts of other users are made, such as bulletins made by a user are many, or many comments are written on the user's bulletins), the branch of the corresponding tree is grown and becomes thick.

The information of each of the other users subscribed to the service is expressed on a leaf as shown in FIGS. 2, 3 and 4, and may be enlarged and confirmed by the user clicking/touching the leaf.

C) Decay of User Account Tree

Meanwhile, in the case the activity of a user in the service is insufficient or the user withdraws from the service, the grown tree is expressed in the form of decay as shown in FIG. 4. At this time, in the case user's activities in the service are insufficient (e.g., a user has not accessed to the service within recent one month or has not made bulletins in the service), the tree is depicted as being withered state or having its leaves falling off, and in the case there is no exchange with other related users, the leaves of the related users are depicted as leaves fallen around the tree of the user.

That is, when the activities in the corresponding small group are insufficient (e.g., there is no visit of other users within one month), the corresponding branch of the tree is decayed and becomes thin. When the activities in the corresponding small group are insufficient even after the notification of the service provider, the corresponding branch of the tree is broken and falls on the ground.

Also, the leaf of a user who scarcely interacts with other users within a corresponding small group is expressed such that it is changed in color from green to yellow and finally falls like a dead leaf.

Meanwhile, when the activities of a user are insufficient in the service, the service provider server notifies such a fact to the user through a "notification alarm", a "mail alarm", or the like, and request the user to perform continuous activities through such an alarm.

3. Display Information Corresponding to Branch and Leaf

A) Information Corresponding to Branch and Leaf

Figure 5:
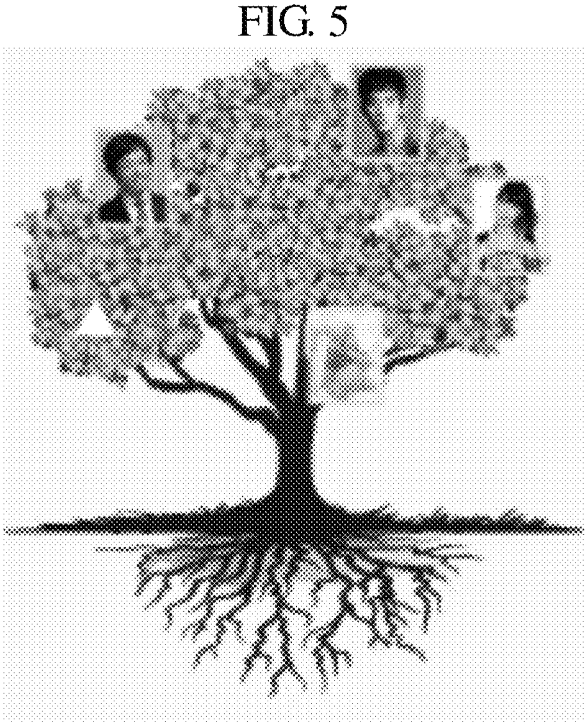
FIGS. 5, 6 and 7 are illustration views of dynamic focusing techniques for providing an effective service without a platform in accordance with an exemplary embodiment of the present disclosure.

FIG. 5 generally shows current activities of users in a service. Members related according to a small group of users are expressed in the form of leaves on trunks and branches.

The above-described expression will be described by exemplifying branches of alumni of users.

A user sets a gathering of alumni born in the year of xxxx, xx-dong, Seoul as a small group, i.e., a large branch (hereinafter, branch R). Then, when the user sets the gathering of alumni into elementary school A (hereinafter, branch A), middle school B (hereinafter, branch B), high school C, and (hereinafter, branch C), respectively, small branches (branches A, B, and C) related to branch R are respectively created.

At this time, the users related to each school are expressed in the form of leaves. Branch R is a super ordinate concept (big branch) to branches A, B, and C, branch A is a super ordinate concept to branch B, and branch B is a super ordinate concept to branch C.

Herein, a member having a large of common relationship (common graduate schools) with the user is expressed as a leaf dangling on a super ordinate (big) branch.

B) Detailed Confirmation of Information Through Enlargement of Trunk and Leaf of Tree At this time, in the case the user intends to confirm information of the small group or a member or to make an interaction (input of bulletin, writing of a comment, etc.) with the small group or a member, the user may enlarge or confirm the detailed information by clicking/touching the corresponding trunk, branch or leaf.

Figure 6:
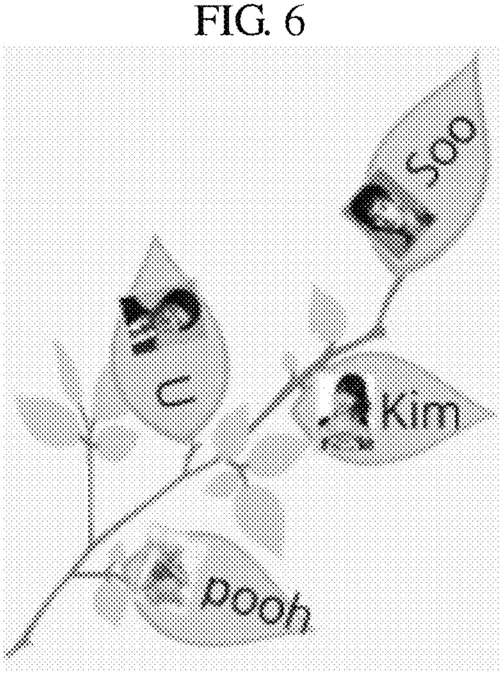

For example, when the user sets a trunk of an entertainer acquainted with himself/herself and then clicks/touches the trunk in FIG. 5, the information of related members may be enlarged or confirmed as shown in FIG. 6.

Figure 7:

When the user wants to confirm the information of each of other users in more detail, the user may click/touch the leaf of wanting more detailed information among the leaves shown in FIG. 6 to confirm enlarged and detailed information as shown in FIG. 7.

In the above description, when the user wants to confirm detailed information of a small group or some of other users, the user may touch/click a screen to enlarge the information, in which the dynamic focusing technique is used.

The dynamic focusing technique indicates a technique of adjusting a range displayed on the screen freely (in a larger or smaller image) according to details of data wanting to read writing regardless of types of used devices (terminals, such as smartphone, smart pad, PC, etc.) or platforms.

By applying the dynamic focusing technique, since the user may grasp an overall screen, i.e., an overall structure of a tree at a glance as shown in FIG. 5, comprehensively perceive activities thereof, and enlarge only a wanted portion of information according to selection thereof, it is possible to acquire detailed information of a selected portion.

4. Use Method (Writing Comment and Recommendation) of User Information

When a user logs in the present service using a mobile device or personal computer (PC), the user may read overall activities thereof as shown in FIG. 3.

At this time, when the user clicks/touches a region of wanting to read or write, the screen moves to the corresponding region. At this time, as shown in FIG. 13, shortcut keys (Home, Tree, Root, ☆) on a screen may be used for easy movement.

Here, ‘Home’ is a shortcut key for moving to a screen capable of viewing an overall structure of a tree, ‘Tree’ is a shortcut key for moving to a screen capable of viewing an overall structure of a unit tree, ‘Root’ is a shortcut key for moving to a screen capable of viewing an overall structure of a unit root, and ‘☆’ is a shortcut key for moving to a user definition screen.

Meanwhile, it is possible to access to a user who does not know the position of the corresponding group using a dynamic focusing-grafted search technique.

For example, when a user intends to make a donation to a company which plants trees in a yellow dust area of China, the user clicks/touches the user definition key shown in FIG. 13 to execute a web browser associated with a general search method. At this time, the web browser provides a function of retrieving a company or other user who makes a donation having the same or similar purpose. In the case a company or other user who makes a donation having the same or similar purpose is retrieved, the user may click/touch the company or other user to confirm information of the company or other user. By doing so, the user may contact other users and participate in social activities of other users according to intention thereof.

That is, the user may contact a cooperative company or other users by using a method in which information and data which the user wants to read are displayed by a protocol enabling display of information in a corresponding platform according to the type of information, and may also participate in social activities of the cooperative company or other users.

5. Use Method of User Information and Method for Associating User Information with Off-Line Activity An SNS user of the present disclosure may associate SNS activities thereof with off-line social activities by using a user account tree created first by subscription of the SNS, and event trees thereafter created by activities thereof. That is, in addition to the user account tree created by information inputted in first subscription of the user, new trees (event trees) are created by user’s social activities.

For example, in the case a user intends to make a donation to a related company which plants trees in a yellow dust area of China, when the user inputs a keyword “company plating trees in a yellow dust area” in the search box connected to the above-described web browser so that companies matched with the user’s intention are searched, the user selects any of the searched companies. Thereafter, when the user makes a donation to the selected company, a new event tree (in this case, donation tree) is set to the user.

In another way, the user searches other users who do the same or similar activities to his/her donation activity within the user’s small group or among other users by using a search method associated with the dynamic focusing technique.

After confirming activities of the searched other users through sizes or colors of trees, the user expresses intention thereof by way of writing a comment on a branch of a donation tree of other user in order to participate in the donation activities of other users.

From another user point of view, the color of the user’s leaf is darkened in a sequence of yellow, light green, deep green, green and dark green to express the activity according to the activity of the user who participates in the donation activity.

Such donation activities and color changes of leaves are shared in the form of a donation tree with the user who first participates in the donation activity and all of the other users who have formerly participated in the donation activity, and the donation tree may be confirmed from the account of each of the users who have participated in the donation.

The new tree (event tree) created by a social activity of the user may be created in association with various off-line activities as well as the exemplified donation activity.

For example, the new tree may be used when the user wants to share off-line activities, such as conferences, seminars, meetings, get-togethers, etc. with other users.

Figure 8:
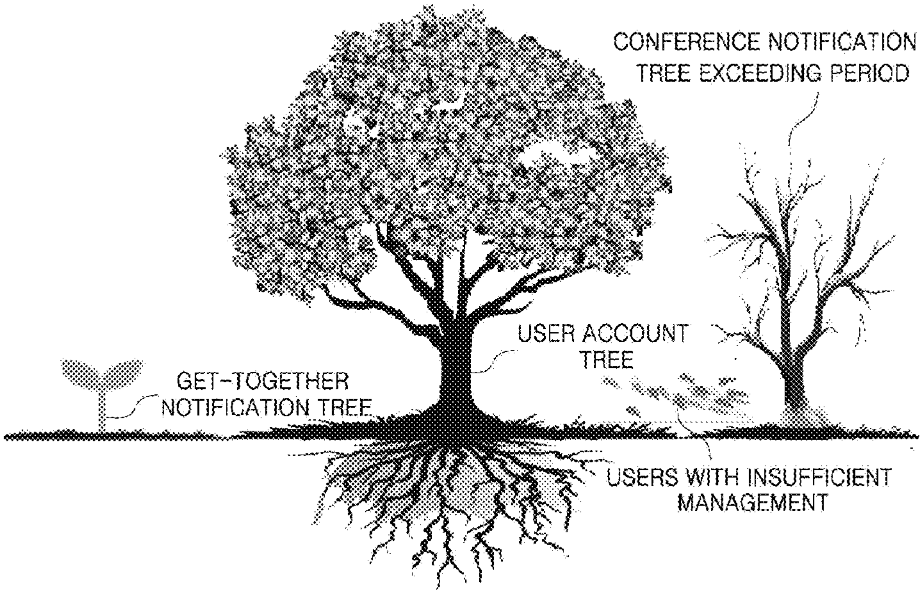
FIG. 8 is an illustration view showing creation and decay of a user account tree and event trees according to an exemplary embodiment of the present disclosure.

Referring to FIG. 8, a user who wants to notify a get-together sets an event tree (herein, a get-together notification tree).

Thereafter, the user who notifies the get-together may do a survey to determine place or menu of the get-together targeting other users on the get-together notification tree together with notification of the get-together itself. The other users who have confirmed the notification may express their opinions for the place and menu of the get-together (in the form of a comment or a new bulletin board message).

At this time, the branch of the get-together notification tree set by the user becomes thick according to the degree of activities of other users (e.g., three or more bulletin board messages, three or more comments, etc.). The leaves of the members included in the get-together notification tree are expressed in brown at first, and are then expressed to be gradually changed to green in color according to the activity (writing a bulletin board message or a comment).

Meanwhile, in the case the use of the get-together notification tree is ended, for example, the get-together is ended, as time elapses (e.g., after three days elapse from notification date, leaves fall down, after three days again elapse, branches fall down, after all, the get-together notification tree is decayed, and after one month, and goes out existence like a 'conference notification tree exceeding the period', shown on right of FIG. 8), the get-together tree is depicted as decaying figure.

6. Method of Connecting External Company

Figure 9:
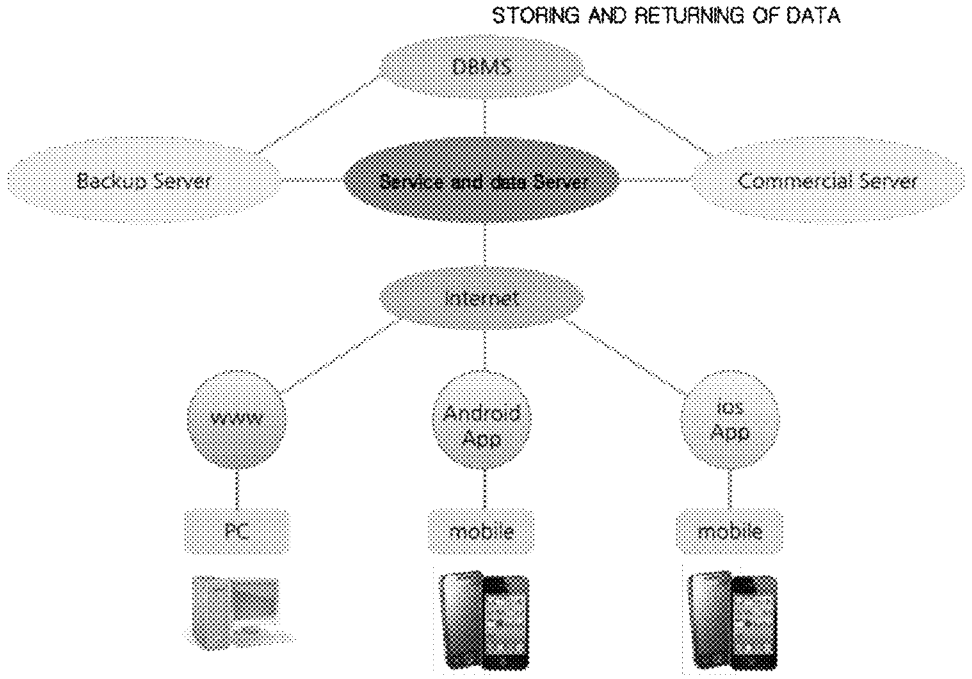
FIG. 9 is a flow diagram showing a data transfer process and a service processing sequence in accordance with an exemplary embodiment of the present disclosure.

Regarding donation activity or social activity requested by the user, the user is connected to organizations or companies conducting actual business associated with the commercial server of the present service to deliver a request thereof as illustrated in FIG. 9.

Thereafter, the corresponding organization or company discloses an execution result in the present service according to the user's request so that the user may verify and monitor results of the donation activity or social activity selected by himself/herself in the above-described method.

Figure 10:
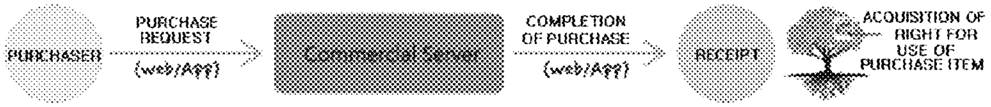
FIG. 10 is a concept view for purchase of an item in accordance with an exemplary embodiment of the present disclosure.
Figure 11:
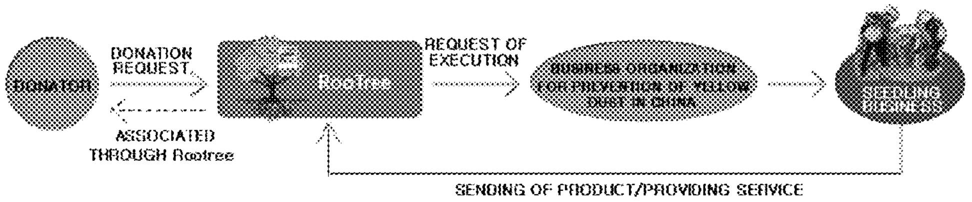
FIG. 11 is an illustration view for realization of off-line social activities in accordance with an exemplary embodiment of the present disclosure.
Figure 12:
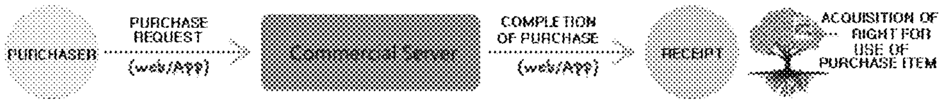
FIG. 12 is an illustration view showing a purchasing process and a benefit distributing process with a business partner in accordance with an embodiment of the present disclosure.

Referring to FIGS. 10, 11 and 12, matters regarding purchase of charged items, donation, service providing between related companies, a method of distributing benefits, and distribution of benefits with cooperative companies comply with typical electronic commerce rules.

Resultantly, the user account tree and the event trees (donation tree, get-together notification tree, etc.) are integratedly expressed as illustrated in FIG. 15.

Through the means for solving the objects, the user information for expression may be clearly divided into private information and public information by separately classifying a private information region and a public information region for users as a trunk and branch region and a root region.

This, since setting of disclosure information and non-disclosure information may be effectively performed, the problems of personal information leakage, privacy invasion, and the like that may be caused in the existing SNS can be prevented in advance.

Also, the SNS in accordance with the present disclosure does not stay in limited functions, such as flat and simple opinion exchange between users, sharing of news, etc., but expresses relationships between users to correspond to creation, growth and decay of a tree structure (branches and leaves of a tree) connected between the users.

Resultantly, the SNS in accordance with the present disclosure may visually clearly express relationships between users or activities of small groups in which users subscribe so that the users may instantly catch the degree of SNS activity and cope with the situation.

Moreover, since the SNS is conducted not in a text-based environment but in a graphic-based environment, it is the greatest improvement that the users may easily manage personal connections thereof and very easily and intuitively manage relationships between users.

Also, the present disclosure is advantageous in that it is very easy to make use of the present disclosure, for example, to add other types of services, such as to use charged or free of items (e.g., purchase, gift, etc.), to make a donation, and to hold a meeting or a seminar, and the method of the present disclosure may be intuitively and efficiently used.

Although the method and system of providing a social network service have been described with reference to the specific embodiments, they are not limited thereto. Therefore, it will be readily understood by those skilled in the art that various modifications and changes can be made thereto without departing from the spirit and scope of the present disclosure defined by the appended claims.

What is claimed is:

1. A method of providing a social network service (SNS), the method comprising:

a user account creation displaying process of displaying creation of a user account by a user terminal;

a relationship change displaying process of displaying a relationship change between the user account and other user accounts;

a user account change displaying process of displaying activity of the user account; and an off-line activity displaying process of displaying off-line activity of the user account, wherein the user account creation displaying process comprises a user account tree creating and displaying process of creating a user account tree expressing the user account and displaying the created user account tree in a graphic, wherein the relationship change displaying process comprises:

a user participation small group displaying process of displaying a small group including other user accounts related to the user account of the user account tree in a graphic corresponding to a branch of the user account tree; and another user accounts displaying process of displaying the other user accounts of the small group in a graphic corresponding to leaves dangling on the branch, wherein the user account change displaying process displays a change process of the activity of the user account in a graphic of the user account tree, the change process being divided into a plurality of stages, each of the plurality of stages corresponding to life cycle of the user account tree comprising a series of processes of creation, growth, decay and extinction, and the respective stages of the life cycle of the tree being expressed in different graphic information corresponding to the graphic of the user account tree, wherein the off-line activity display process comprises:

a process of creating an event tree separate from the user account tree to display the created event tree into an event tree graphic so as to correspond to an event associated with the off-line activity of the user account; and a process of displaying the event tree graphic in different graphic information corresponding to the life cycle including a series of processes of creation, growth, decay and extinction of the tree depending on a degree of participation of the other user accounts with respect to the event and the duration of the event.

2. The method of claim 1, wherein a degree of exchange between the user account and the small group is depicted in a graphic to correspond to a change in thickness or color of the branch of the tree.

3. The method of claim 1, wherein a degree of exchange between the other user accounts in the small group is depicted in a graphic to correspond to a change in color of the leaves and fallen leaves.

4. The method of claim 1, wherein the event tree has a cycle of creation, growth, decay and extinction which correspond to the number or activity of participants participating in the off-line connection activity and are expressed in graphics.

5. The method of claim 1, wherein the graphics for the tree, the leaves, and the branches are expressed by applying a dynamic focusing technique such that information of other users related to the leaves and branches corresponding to the number of clicks or touches of the user is sequentially enlarged and displayed regardless of resolution and platform of a terminal used by the user.

6. The method of claim 1, wherein the information set to be disclosed by the user is displayed corresponding to structures of trunks and branches of the tree, and the information set not to be disclosed by the user is displayed corresponding to a root structure of the event tree graphic.

7. A system of providing a social network service which expresses activity of a user account to correspond to a life cycle of a creature, the system comprising:

a user terminal;

a user access managing unit;

a user database server;

an SNS managing server;

a web browser-associated server; and a backup server, wherein the user terminal is adapted to express a creation process of a user account, a change of relationship between the user account and other user accounts, a change of activity of the user account, and an off-line activity of the user account in graphics to correspond to a growth process of a tree, and wherein the off-line activity of the user account is displayable in a graphic by creating an event tree separate from the tree corresponding to the user account so as to correspond to an event associated with the off-line activity of the user account, and the graphic of the event tree is displayable in different graphic information corresponding to life cycle including a series of processes of creation, growth, decay, and extinction of the tree depending on the degree of participation of the user account and duration of the event.

8. The system of claim 7, wherein the user terminal has an input/output interface enabling the user to input or correct user information and provide a function setting a new event tree by inputting an off-line activity.

9. The system of claim 7, further comprising a commercial server adapted to separately manage company account information, wherein the company account information is associated with off-line activity information in which the user wants to participate, and further adapted to perform a function of providing contents associated with the off-line activity of the user.

10. The system of claim 9, wherein the commercial server is adapted to store data of companies providing off-line activities for users when the users want activities associated with off-line, input data thereof to a corresponding server, and then provide information updating the corresponding data depending on activities thereof.

11. The system of claim 7, wherein the user database server is adapted to store user information or change of activity inputted by the user, and is further adapted to provide the stored information or the change of activity to the user when the user searches the user information and the change of activity.

12. The system of claim 7, wherein the SNS managing server is adapted to display the corresponding information on a user account tree or an event tree based on the user input information and the information inputted by a commercial company, incorporate the information associated with a web browser to display the incorporated information as trees of the user account, other users or the commercial company such that the user, the other users and the company can identify the trees displayed on the respective accounts at the same time.

13. The system of claim 7, wherein the web browser-associated server is associated with a web browser by clicking or touching a function set as the user account on the user terminal and is adapted to search the information corresponding to keyword input of the user.

14. The system of claim 7, wherein the backup server is adapted to store user information, web browser-associated information, information updated in the commercial server, and the like, and is further adapted to minimize system error or data loss by automatically storing the user information, the web browser-associated information, and information changed in the commercial server when the user information, the web browser-associated information and the information stored in the commercial server are changed.

* * * * *